US005623869A

United States Patent [19]
Moss et al.

[11] Patent Number: 5,623,869
[45] Date of Patent: Apr. 29, 1997

[54] LAPTOP TABLE FOR PORTABLE COMPUTERS

[75] Inventors: David L. Moss; Erica J. Scholder, both of Austin, Tex.

[73] Assignee: Dell Computer Corporation, Austin, Tex.

[21] Appl. No.: 599,502

[22] Filed: Jan. 25, 1996

[51] Int. Cl.$^6$ .................................................. A47B 23/00
[52] U.S. Cl. .................................................. 108/43; 248/917
[58] Field of Search .................. 108/43, 44; 248/917, 248/918, 450, 451, 444

[56] References Cited

U.S. PATENT DOCUMENTS

| | | | |
|---|---|---|---|
| 747,188 | 12/1903 | Klee | 248/451 |
| 4,052,944 | 10/1977 | Jennings | 108/44 X |
| 4,909,159 | 3/1990 | Gonsoulin | 108/44 |
| 4,946,120 | 8/1990 | Hatcher | 108/44 X |
| 5,005,702 | 4/1991 | Davis et al. | 108/43 X |
| 5,038,688 | 8/1991 | Permenter | 108/43 |
| 5,134,930 | 8/1992 | Mei-Hwa | 108/43 X |
| 5,374,018 | 12/1994 | Daneshvar | 248/918 X |
| 5,490,466 | 2/1996 | Diffrient | 248/918 X |
| 5,509,844 | 4/1996 | Poirier et al. | 108/43 X |

*Primary Examiner*—Jose V. Chen
*Attorney, Agent, or Firm*—Hitt Chwang & Gaines, P.C.

[57] ABSTRACT

The present invention provides lap table for a portable computer. The lap table comprises a supple main body that has a top surface joined to a bottom surface and a sealed hollow interior for containing a filling material to give the main body a degree of rigidity sufficient to support the portable computer thereon. The filling material may be either an inflating gas or styrofoam beads. The lap table also includes a securing wall integral with the top surface that is configured to receive a footprint of the portable computer and exert a positive securing force against the portable computer, to thereby secure the portable computer to the top surface when the hollow interior is filled with the filling material. The securing wall may comprise four spaced-apart opposing right angled projections, the projections spaced to receive four opposing bottom corners of the portable computer.

16 Claims, 2 Drawing Sheets

LAPTOP TABLE FOR PORTABLE COMPUTERS

TECHNICAL FIELD OF THE INVENTION

The present invention is directed, in general, to a laptop table for portable computers and, more specifically, to an inflatable laptop table for portable computers.

BACKGROUND OF THE INVENTION

The use of and advantages associated with portable computers are well known in the art. Over the last decade, there has been an intense effort in the computer industry to down size the personal computer ("PC") to provide users with a powerful yet portable computer that can be taken out of the office and fully used at home or on the road. As advancements have been made in both microprocessing chip and battery technologies, particularly over the last decade, PCs were eventually downsized into "laptop computers". While these computers offered the portability and processing power of a full sized PC, the laptop was still somewhat large and heavy for the user to carry around. In response to these disadvantages, the laptops were downsized even further into what is now commonly known in the industry as a notebook computer, which is smaller and more light weight yet possessing equal or greater processing capabilities than their earlier laptop counterpart.

Because of their portability, notebook computers are frequently used in various places that require the user to operate the notebook computer from their lap, hence their name for their earlier counterpart. In such instances, the portable computer is typically positioned in the user's lap such that it requires the user to type with his or her wrists uncomfortably bent upwardly at an unnatural angle. Notebook computers are also frequently used on airplanes. In such instances, the user is usually forced to either balance the machine on his or her knees or put it on the seat/table in front, which does not provide a very comfortable use elevation. Additionally, notebook computers are used when the user is reclining on his or her back with knees bent to support the angled unit. However, this too is an uncomfortable position from which to operate the machine.

While bean-bag lap desks, which are well known in the art, could be used, they do not provide the structure necessary to hold the notebook computer on the flat surface when the portable computer is positioned at a step angle, and they hinder the portability aspect of the notebook computer when the machine is used "on the road." Moreover, they do not provide a wrist rest or palm rest that is helpful in preventing or exacerbating any pre-existing condition resulting from prolonged typing operations, such as tunnel carpel syndrome ("CTS") or other typing-related injury that the user may have.

Accordingly, there is a need in the art for a lap table for portable computers that: 1) provides adequate structure for securely holding the portable computer in place even at extreme inclinations; 2) is portable; and 3) provide a wrist or palm rest. Various aspects of the present invention provides a lap table that addresses these needs.

SUMMARY OF THE INVENTION

To address the above-discussed deficiencies of the prior art, the present invention provides a lap table for a portable computer. In a preferred embodiment, the lap table comprises a supple main body having a top surface joined to a bottom surface. The main body, which preferably comprises a supple plastic or metal-coated plastic material, has a sealed hollow interior for containing a filling material to give the main body a degree of rigidity sufficient to support the portable computer thereon. Preferably, the filling material is comprised of either an inflating gas or styrofoam beads. The lap table also includes a securing wall integral with the top surface that is configured to receive a footprint of the portable computer and exert a positive securing force against the portable computer, to thereby secure the portable computer to the top surface when the hollow interior is filled with the filling material. Preferably, the securing wall comprises four spaced-apart, opposing right angled projections. The projections are spaced and positioned on the top surface to securely receive four opposing bottom corners of the portable computer.

The combination of the supple main body and the integral securing wall provides a lap table that accommodates a portable computer, that is easy to move, and that allows the user to use the portable computer in a number of sitting or reclining positions.

In another aspect of the present invention, the lap table further comprises a wrist rest integral with the top surface to provide support for a user's wrists as the user operates the portable computer. The presence of the wrist rest is highly desirable in those instances where the angle between the portable computer and the user causes the user to bend his or her wrists at an unnatural angle. The wrist rest elevates the user's hand to a more natural position, thereby lessening the strain on the user's wrists and hands. Preferably, the wrist rest has a sealed hollow interior in fluid communication with the hollow interior of the main body to receive the inflating gas therein, to thereby give the wrist rest a degree of rigidity sufficient to support a user's wrist as the user operates the portable computer.

In a preferred aspect of the present invention, the filling material is an inflating gas and the main body further includes an inflating gas intake valve for receiving the inflating gas into the hollow interior of the main body, to thereby give the main body a degree of rigidity sufficient to support the portable computer thereon. This embodiment provides a highly portable lap table for a personal computer that allows the user to simply inflate the lap table whenever desired. Moreover, due to its supple characteristic, it can easily be deflated, folded, and stored in the same carrying case in which the portable computer is transported.

In another aspect of the present invention, the securing wall has a sealed hollow interior in fluid communication with the hollow interior of the main body to receive the inflating gas therein which gives the securing wall a degree of rigidity sufficient to secure the portable computer to the main body. While the securing wall may be a rigid material that is integrally attached to the main body, it is more desirable that the securing wall be inflatable because this adds to its compactness and portability.

In another embodiment of the present invention, the lap table further comprises a supple side support that depends from the main body and that extends along the perimeter of the main body a predetermined distance. The side support has a sealed hollow interior for containing a filling material capable of giving the side support a degree of rigidity sufficient to support the main body. In a preferred embodiment, the side support comprises two side support walls depending from opposite sides of the main body. Each of the two side support walls are configured to extend partially around a user's knee, to thereby limit movement of the main body toward the user when positioned in a lap of the user. Preferably, however, the filling material is an inflating gas and the supple side support further includes an inflating gas intake valve for receiving the inflating gas into the hollow interior of the side support.

In another preferred embodiment, the main body has an opening formed through a middle portion thereof to expose a bottom surface of the portable computer to a surrounding environment for cooling the portable computer and to isolate the bottom surface of the portable computer from a user's body.

In another preferred embodiment, the present invention provides an inflatable lap table for a portable computer that comprises a supple main body having a top surface coupled to a bottom surface. The main body, which preferably comprises a supple plastic material, has a sealed hollow interior for containing an inflating gas to give the main body a degree of rigidity sufficient to support the portable computer thereon. Additionally, the main body may also have an opening formed through a middle portion thereof to expose a bottom surface of the portable computer for cooling the portable computer and to isolate the bottom surface of the portable computer from a user's body. The main body also includes an inflating gas intake valve integral with the main body for receiving the inflating gas into the hollow interior of the main body.

Further included is a securing wall integral with the top surface that is configured to receive a footprint of the portable computer and exert a positive securing force against the portable computer. The securing wall has a sealed hollow interior in fluid communication with the hollow interior of the main body to receive the inflating gas therein, which gives the securing wall a degree of rigidity sufficient to secure the portable computer to the main body. In a preferred embodiment, the securing wall comprises four spaced-apart opposing right angled projections that are positioned and spaced on the top surface to receive the four opposing bottom corners of the portable computer.

Preferably, the inflatable lap table further comprises a wrist rest integral with the top surface to provide support for a user's wrists. In a preferred embodiment, the wrist rest has a sealed hollow interior in fluid communication with the hollow interior of the main body to receive the inflating gas therein, which gives the wrist rest a degree of rigidity sufficient to support a user's wrist when the user is operating the portable computer.

In yet another embodiment, the lap table comprises a supple side support depending from the main body and extending along the perimeter of the main body a predetermined distance. The side support has a sealed hollow interior for containing an inflating gas to give the side support a degree of rigidity sufficient to support the main body. Preferably, the supple side support includes an inflating gas intake valve for receiving the inflating gas into the hollow interior of the side support wall. More preferably, however, the side support comprises two side support walls depending from opposite sides of the main body. Each of the two side wall supports preferably have an inflating gas intake valve and are configured to extend partially around a user's knee, to thereby limit movement of the main body toward the user when positioned in a lap of the user.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
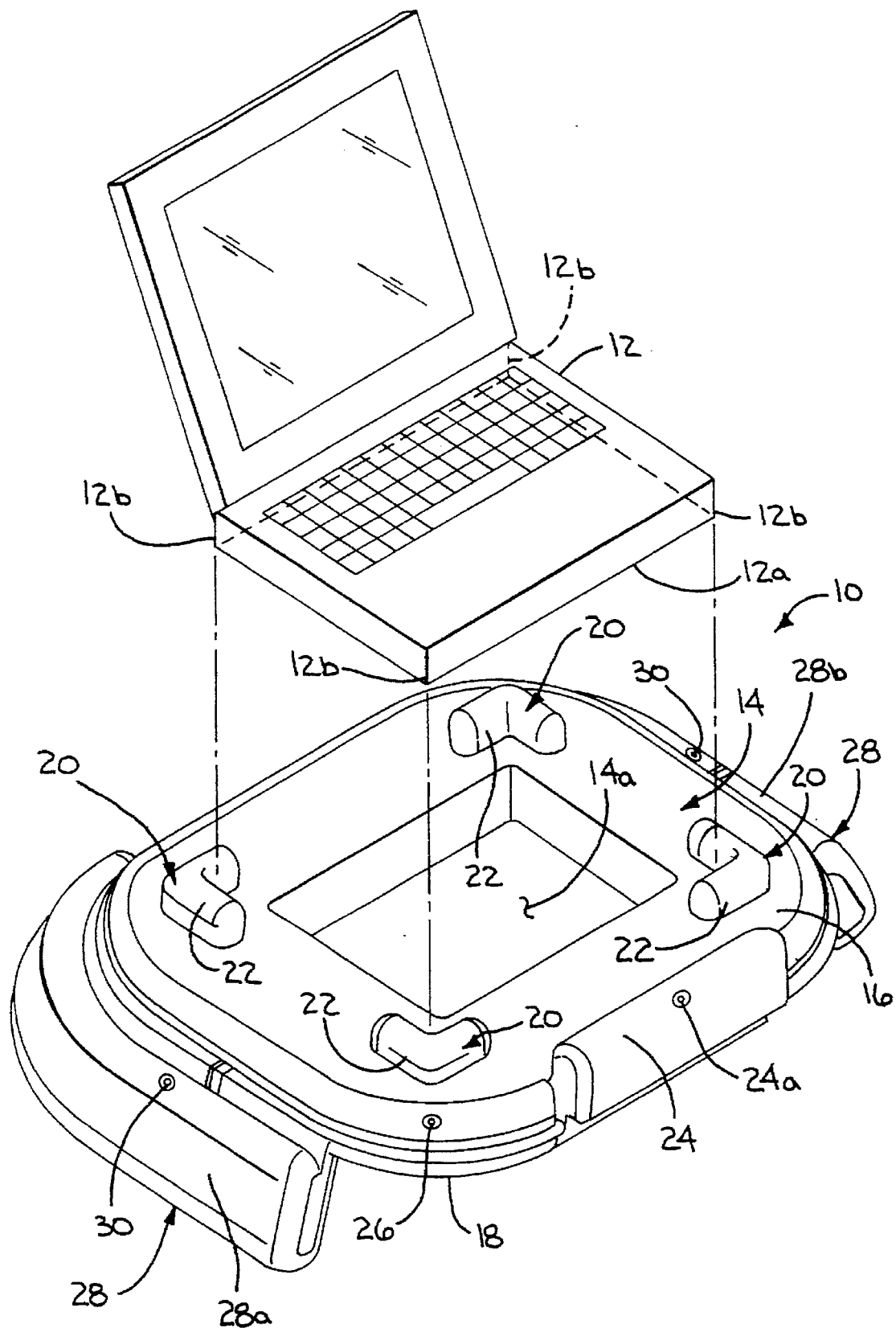
FIG. 1 illustrates an isometric view of a preferred embodiment of the lap table of the present invention with a portable computer exploded therefrom.

Referring initially to FIG. 1, there is illustrated In a preferred embodiment, a lap table 10 configured to receive and support a portable computer 12, such as a notebook computer, having a footprint, which is formed by the perimeter of the base 12a of the portable computer 12. The lap table 10 has a supple main body 14 with a top surface 16 joined to a bottom surface 18.

Preferably, the main body 14 has a generally rectangular tubular shape with a sealed hollow interior for containing a filling material that gives the main body 14 a degree of rigidity sufficient to support the portable computer 12 thereon. As used herein, the phrase "degree of rigidity sufficient to support the portable computer" means that when the main body 14 is filled with the filling material, the lap table 10 is rigid enough to support the portable computer 12; that is the portable computer 12 is supported directly by the lap table 10 and is not supported directly by any other support, such as a user's lap or another table or support surface. In a preferred embodiment, the main body 14 has a size and shape that is designed to support the portable computer 12 on the user's lap or on some other support surface, such as a table top. A preferred embodiment of the main body 14 also includes an opening 14a formed through a middle portion thereof to expose a bottom surface 12a of the portable computer 12 to the surrounding environment for cooling the portable computer and to isolate the bottom surface 12a from the user's body. In most cases, the filling material is preferably comprised of either an inflating gas, such as air or carbon dioxide or styrofoam beads. However, it should be understood that many other known filling materials (both gaseous or solid materials) could be used. Depending on the type of filling material to be used, the lap table 10 may be made from such materials as cloth, leather, vinyl-type materials, such as those typically used in the manufacture of bean-bags, rubber, plastic materials or metal-coated plastic materials, such as those used in the manufacture of balloons. In a preferred embodiment, however, the lap table 10 is comprised of a supple plastic material that is capable of containing an inflating gaseous material and that is capable of easily being folded to a compact configuration when deflated.

The main body 14 also includes a securing wall 20 integral with the top surface 16 that is configured to receive the footprint of the portable computer 12 and exert a positive securing force against the portable computer 12. The securing wall 20 may take a number of configurations. For instance, the securing wall 20 may be a single wall or a recess area formed in the top surface 16 that has the same shape and a perimeter that is approximately the same size as the footprint of the portable computer 12. While a securing wall that includes a mechanical securing structure is not specifically discussed herein, it should be understood that such a mechanical mechanism is not outside the scope of the present invention.

In a preferred embodiment, the securing wall 20 has a sealed hollow interior in fluid communication with the hollow interior of the main body 14 to receive the filling material, preferably an inflating gas, therein which gives the securing wall 20 a degree of rigidity sufficient to secure the portable computer 12 to the main body 14. In other words, the filling materials makes the securing wall 20 rigid enough to hold the portable computer 12 in place when positioned on the lap table 10. While the securing wall 20 may be a rigid material that is integrally attached to the main body 14, it is more desirable that the securing wall 20 be integral with the main body 14 and be inflatable because this adds to its compactness and portability. More preferably, however, the securing wall 20 comprises four spaced-apart, opposing right angled projections 22 that are positioned on the top surface 16 and spaced and positioned to receive the bottom corners 12b of the portable computer 12. In either embodiment, the securing wall 20 is configured to snugly receive the portable computer 12 and exert a positive securing force against the portable computer 12.

The lap table 10 may also further comprise a wrist rest 24 integral with the top surface 16 to provide support for the user's wrists or palms as the user operates the portable computer 12. Preferably, the wrist rest 24 has a sealed hollow interior in fluid communication with the hollow interior of the main body 14 to receive the inflating gas therein. However, it will also be appreciated that hollow portion of the wrist rest 24 may be isolated from the hollow interior of the main body 14 such that it can be selectively filled with the filling material only if required. In those embodiments where the filling material is an inflating gas, the wrist rest 24 may also include its own inflating gas intake valve 24a that allows the user to selectively inflate the wrist rest 24. Once filled with the desired filling material, the wrist rest 24 is rigid enough to provide support for the user's wrist when the user operates the portable computer 12. The presence of the wrist rest 24 is highly desirable in those instances where the angle between the portable computer 12 and the user causes the user to bend his or her wrists at an unnatural angle. The wrist rest 24 elevates the user's hand to a more natural position, thereby lessening the strain on the user's wrists and hands.

In those embodiments where an inflating gas is used, the main body 14 further includes an inflating gas intake valve 26 for receiving the inflating gas into the hollow interior of the main body 14. It should be understood that the intake valves discussed herein are preferably of conventional design and include those types that can serve as both intake and output valves. As such, this embodiment provides a highly portable lap table 10 for the portable computer 12 that allows the user to simply inflate the lap table 10 whenever desired. Moreover, due to its supple characteristic, the lap table 10 can easily be folded and stored in the same carrying case in which the portable computer 12 is transported.

In another embodiment, the lap table 10 further comprises a supple side support 28 that depends from the main body 14 and that extends along the perimeter of the main body 14 a predetermined distance. The side support 28 preferably has a sealed hollow interior for containing a filling material capable of giving the side support 28 a degree of rigidity sufficient to support the main body 14; that is, once filled, the side support 28 is rigid enough to prevent the main body 14 from moving with respect to the user's lap, to thereby provide partial support for the main body 14. The side support 28 may flexibly depend from the main body 14 in a way to allow the side support 28 to be flexed to a position that is planar with the main body 14. This feature allows the user to bend the side support 28 out of the way when the lap table 10 is being used on a support surface other than the user's lap. Preferably, however, the filling material is an inflating gas and the supple side support 28 further includes an inflating gas intake valve 30 for receiving the inflating gas into the hollow interior of the side support 28. In a preferred embodiment, the side support 28 comprises two side support walls 28a, 28b depending from opposite sides of the main body 14. Each of the two side support walls 28a, 28b are configured to extend partially around the user's knee, to thereby limit movement of the main body 14 toward the user when positioned in the user's lap.

Figure 2:
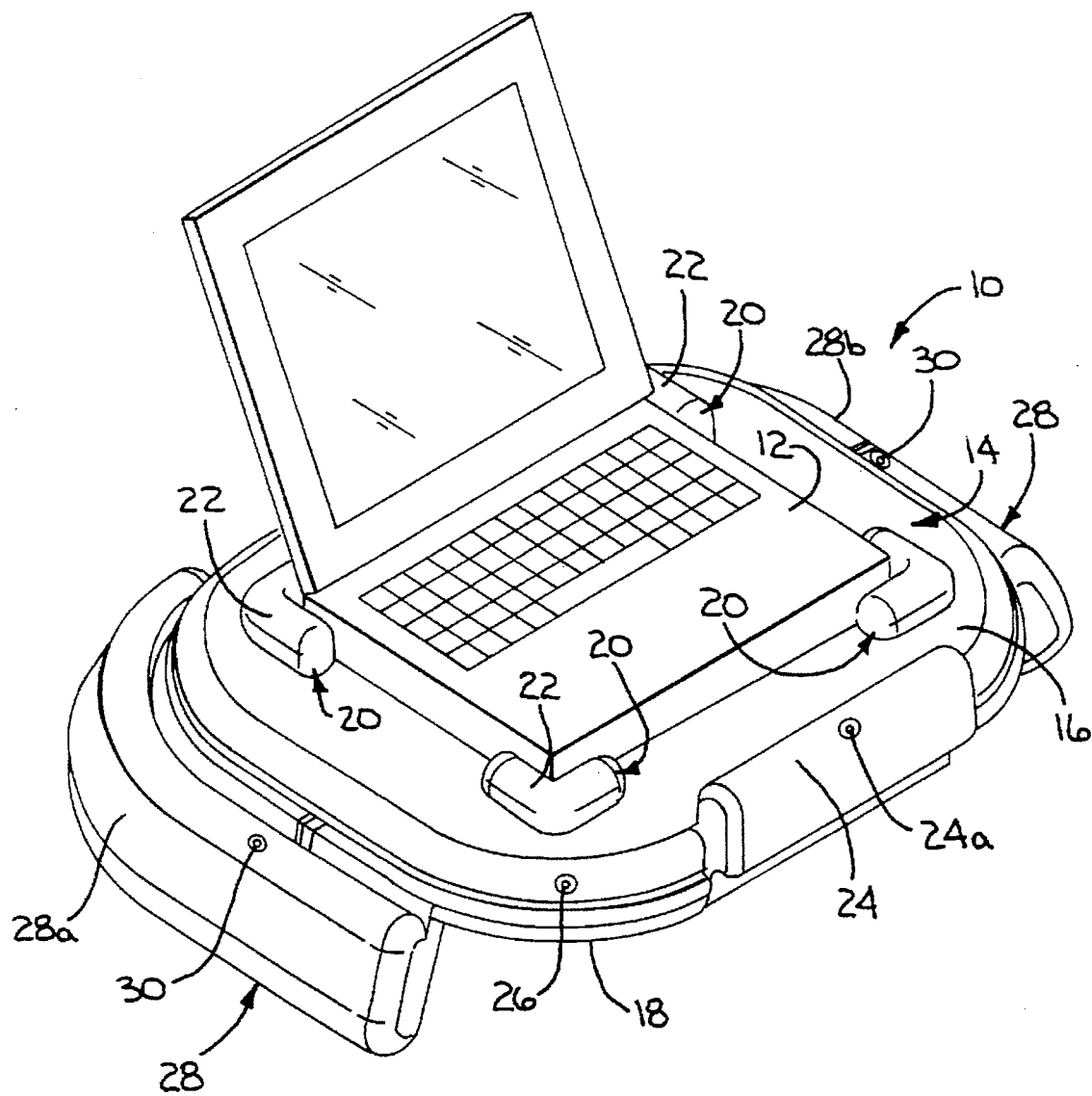
FIG. 2 illustrates an isometric view of a preferred embodiment of the lap table of the present invention with a portable computer secured to the lap table by the securing walls.

Turning now briefly to FIG. 2, there is illustrated the lap table 10 with the portable computer 12 received the securing wall 20. The lap table 10 is filled with the filling material to a degree of rigidity to support the portable computer 12 above the user's lap, table top or other support surface. In a preferred method of use, the user would remove the deflated lap table 10 from the portable computer's 12 carrying case and then inflate the main body 14 by placing the inflating gas valve 26 either in the user's mouth and forcing carbon dioxide into the main body 14 through the intake valve 26 or using an air pump or automatic inflating device to inflate the main body 14 until it's sufficiently inflated to support the portable computer 12. In those instances where the side support walls 28a and 28b are present, the user may also choose to inflate the side support walls 28a and 28b by inflating them by their respective intake valves 30 in the same manner as just described for the main body 14. Additionally, in those embodiments where the wrist rest 24 has its own intake valve 24a, the user may also wish to inflate the wrist rest 24 in the same manner just described for the main body 14. Once sufficiently inflated, the user can then place the portable computer 12 on the main body 14 such that the securing wall 20 securely engages the portable computer's footprint. Of course, in those embodiments where the filling material is styrofoam beads or some other non-gaseous filling material, the filling material will most likely be placed within the lap table 10 at the point of manufacture. In such instances, the lap table 10 is ready for use and inflation is not required.

From the above description, it is apparent that the present invention provides a lap table for a portable computer that comprises a supple main body having a top surface joined to a bottom surface. The main body has a sealed hollow interior for containing a filling material to give the main body a degree of rigidity sufficient to support the portable computer thereon. Preferably, the filling material is comprised of either an inflating gas or styrofoam beads. The lap table also includes a securing wall integral with the top surface that is configured to receive a footprint of the portable computer and exert a positive securing force against the portable computer, to thereby secure the portable computer to the top surface when the hollow interior is filled with the filling material. Preferably, the securing wall comprises four spaced-apart opposing right angled projections, the projections spaced to receive four opposing bottom corners of the portable computer.

Although the present invention and its advantages have been described in detail, those skilled in the art should understand that they can make various changes, substitutions and alterations herein without departing from the spirit and scope of the invention in its broadest form.

What is claimed is:

1. A lap table for a portable computer, comprising:

a supple main body having a top surface joined to a bottom surface, said main body having a sealed hollow interior for containing a filling material to give said main body a degree of rigidity sufficient to support said portable computer thereon;

a securing wall integral with said top surface and configured to receive a footprint of said portable computer and exert a positive securing force against said portable computer to thereby secure said portable computer to said top surface when said hollow interior is filled with said filling material, wherein said filling material is an inflating gas and said main body further includes an inflating gas intake valve for receiving said inflating gas into said hollow interior of said main body, to thereby give said main body a degree of rigidity sufficient to support said portable computer thereon; and a wrist rest having a sealed hollow interior in fluid communication with said hollow interior of said main body to receive said inflating gas therein, to thereby give said wrist rest a degree of rigidity sufficient to support a user's wrist when said user operates said portable computer.

2. The lap table of claim 1 further comprising wherein said wrist rest is integral with said top surface.

3. The lap table of claim 1 wherein said securing wall has a sealed hollow interior in fluid communication with said hollow interior of said main body to receive said inflating gas therein, to thereby give said securing wall a degree of rigidity sufficient to secure said portable computer to said main body.

4. The lap table of claim 1 further comprising a supple side support depending from said main body and extending along the perimeter of said main body a predetermined distance, said side support having a sealed hollow interior for containing a filling material capable of giving said side support a degree of rigidity sufficient partially to support said main body.

5. The lap table of claim 4 wherein said filling material is an inflating gas and said supple side support further includes an inflating gas intake valve for receiving said inflating gas into said hollow interior of said side support, to thereby give said side support a degree of rigidity sufficient to support said main body.

6. The lap table of claim 5 wherein said side support comprises two side support walls depending from opposite sides of said main body, each of said two side support walls having an inflating gas intake valve and being configured to extend partially around a user's knee, to thereby limit movement of said main body toward said user when positioned in a lap of said user.

7. The lap table of claim 1 wherein said main body has an opening formed through a middle portion thereof to expose a bottom surface of said portable computer to a surrounding environment for cooling said portable computer and to isolate said bottom surface of said portable computer from a user's body.

8. The lap table of claim 1 wherein said securing wall comprises four spaced-apart, opposing right angled projections, said projections spaced and positioned to receive four opposing bottom corners of said portable computer.

9. The lap table of claim 1 wherein said main body comprises a supple plastic material.

10. An inflatable lap table for a portable computer, comprising:

a supple main body having a top surface coupled to a bottom surface, said main body having a sealed hollow interior for containing an inflating gas to give said main body a degree of rigidity sufficient to support said portable computer thereon;

an inflating gas intake valve integral with said main body through which said inflating gas may be injected into said hollow interior of said main body;

a securing wall integral with said top surface and configured to receive a footprint of said portable computer and exert a positive securing force against said portable computer, said securing wall having a sealed hollow interior in fluid communication with said hollow interior of said main body to receive said inflating gas therein, to thereby give said securing wall a degree of rigidity sufficient to secure said portable computer to said main body when said main body is filled with said inflating gas; and a wrist rest integral with said stop surface to provide support for a user's wrists; said wrist rest having a sealed hollow interior in fluid communication with said hollow interior of said main body to receive said inflating gas therein, to thereby give said wrist rest a degree of rigidity sufficient to support a user's wrist when said user is operating said portable computer.

11. The inflatable lap table of claim 10 further comprising a supple side support depending from said main body and extending along the perimeter of said main body a predetermined distance, said side support having a sealed hollow interior for containing an inflating gas to give said side support a degree of rigidity sufficient to support said main body.

12. The inflatable lap table of claim 11 wherein said supple side support includes an inflating gas intake valve for receiving said inflating gas into said hollow interior of said side support wall, to thereby give said side support wall a degree of rigidity sufficient to support said main body.

13. The inflatable lap table of claim 12 wherein said side support comprises two side support walls depending from opposite sides of said main body, each of said two side wall supports configured to extend partially around a user's knee, to thereby limit movement of said main body toward said user when positioned in a lap of said user.

14. The inflatable lap table of claim 7 wherein said main body has an opening formed through a middle portion thereof to expose a bottom surface of said portable computer for cooling said portable computer and to isolate said bottom surface of said portable computer from a user's body.

15. The inflatable lap table of claim 10 wherein said securing wall comprises four spaced-apart, opposing right angled projections, said projections spaced to receive four opposing bottom corners of said portable computer.

16. The inflatable lap table of claim 10 wherein said main body comprises a supple plastic or metal-coated plastic material.

* * * * *